June 3, 1930.    I. A. WEAVER    1,761,808
PISTON
Filed Oct. 8, 1927
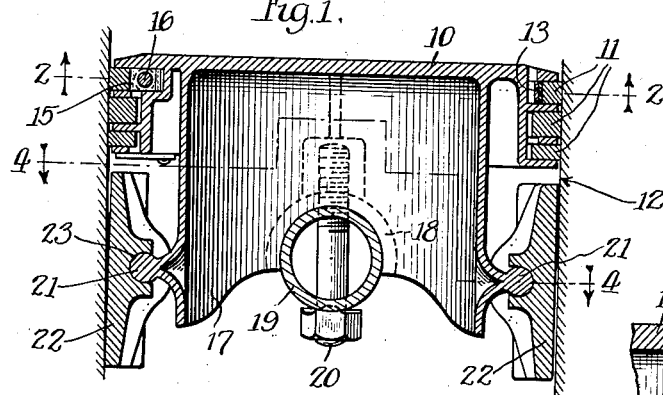
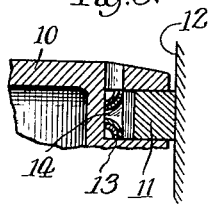
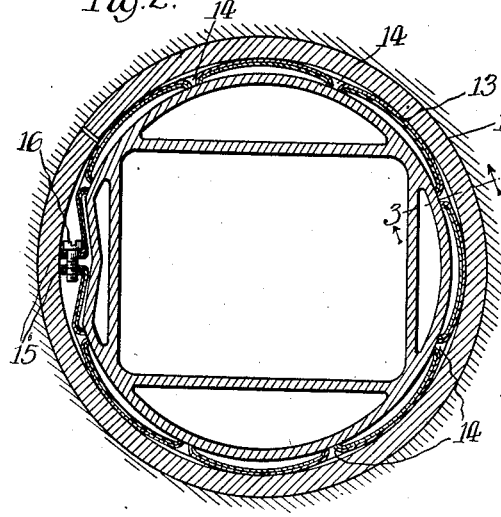
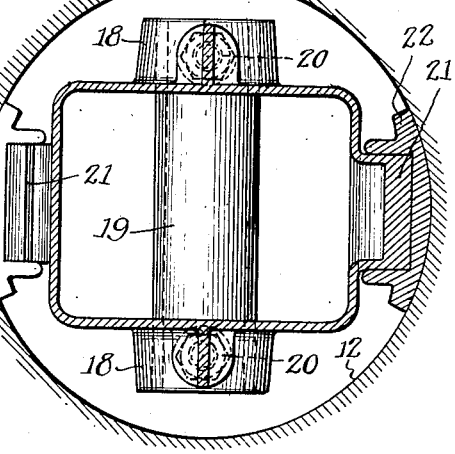
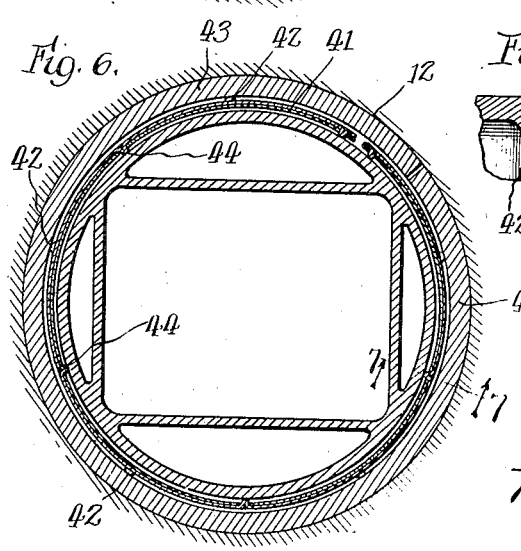
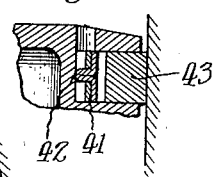
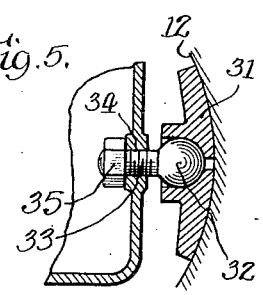
Inventor:
Ira A. Weaver
By Walter M. Fuller
Atty.

Patented June 3, 1930

1,761,808

UNITED STATES PATENT OFFICE

IRA A. WEAVER, OF SPRINGFIELD, ILLINOIS

PISTON

Application filed October 8, 1927. Serial No. 224,805.

My present invention pertains to novel features of construction in pistons, such as are used in internal-combustion engine cylinders, but its advantageous structural and functional characteristics are not limited to this especial use, being of wider application with beneficial results.

One aim of the invention is to produce a piston of a very light weight, preferably of steel, but which will nevertheless have all of the required qualities for the satisfactory and successful performance of its customary functions.

Another purpose of the invention is to supply a piston of this kind which can take advantage of, and operate on, the wedge film principle of lubrication instead of working on the scraping action produced by the present style of piston.

An added object of the invention is the provision of a thermostatic piston-ring construction, which coacts with the means employed for utilizing such wedge film lubrication principle to obtain, as a whole, a piston having those structural features which best adapt it for satisfactory and efficient operation.

For the accomplishment of these and other desirable objects, I have designed the present, preferred embodiments of the invention, which, in order that those skilled in the art may understand their advantages, both from form and operating standpoints, I have illustrated in detail in the accompanying drawing, forming a part of this specification and throughout the views of which like reference numerals have been employed to designate the same parts.

In this drawing:—

Figure 1 is a central, vertical section through one style of the proposed piston, showing the associated cylinder wall also in section;

Figure 2 is a horizontal section on line 2—2 of Figure 1;

Figure 3 is a fragmentary, enlarged, vertical section on line 3—3 of Figure 2;

Figure 4 is a horizontal section on the irregular line 4—4 of Figure 1;

Figure 5 is a horizontal section showing a different mounting for the sliding shoes or guides;

Figure 6 is a horizontal section, similar to that of Figure 2, indicating a somewhat modified construction; and Figure 7 is a fragmentary, vertical section, on an enlarged scale, similar to that of Figure 3, taken on line 7—7 of Figure 6.

As is clearly depicted in such drawing, the head and main body 10 of the improved, light-weight piston is made of relatively-thin, metal, preferably, but not necessarily, steel, and its upper part has a plurality, three in the present instance, of piston-ring grooves, each receiving or housing a split piston-ring 11, of ordinary or convenient style, whose outer cylindrical surface bears on the inner face of the cylinder-wall 12, the two lower piston-rings constituting the sole means occupying their respective piston grooves.

Heretofore, it has been customary to make the upper end of the piston, in which the piston-ring grooves are formed, somewhat smaller in diameter than the skirt of the piston, so that the excessive or high degree of expansion of such upper part of the piston, due to the intense heat to which it is subjected, will not cause it to bind and score the cylinder.

Under such circumstances, obviously, the upper section of the piston cannot act as a guide to hold the piston-rings at right angles to the bore of the cylinder, and therefore causes the rings to ride the film of oil on one side of the cylinder-wall, which is one reason for oil-pumping with its resulting formation of carbon, etc., and such piston tilting or tipping action in its cylinder permits the opposite sides of the piston-rings to scrape the lubricant from the cylinder-wall producing rapid and undue wear.

The skirt of the piston alone forms a comparatively short guide and a little wear produces excessive slapping noise of the piston.

Many efforts have been made to overcome this defect by adding an inner, spring, expansion ring behind the piston-ring to put spring pressure against the cylinder-wall by the piston-ring, and, in this way, attempting to steady and center the upper part of the piston.

The difficulty encountered in this method is that, if the spring or outward pressure is strong enough to stabilize the upper end of the piston, it unduly increases the friction of the ring against the cylinder-wall, especially when such pressure is increased with the added expansion of the piston due to the heat.

According to the principles of the present invention, the upper piston-ring has in its groove behind it, an outwardly-pressing thermostatic member or ring, the expansion of which compensates for the heat-enlargement of the piston-head.

In the embodiment of the invention depicted in Figures 1 and 2, this thermostatic-ring 13 is so formed as to provide a number of integral, comparatively-short, spring-units, which at alternate points press or bear on the piston and ring.

Such bi-metal ring 13 has an inner strip of a greater coefficient of expansion than its outer strip, so that each section of the ring, in expanding, tends to straighten out, and decrease the original outward pressure, the ring being perforated at intervals at 14, 14 with the edges of the metal around such perforations bent inwardly to provide spaced bearings or shoulders engaging the inner piston wall of the groove, such holes weakening the ring at these separated points.

About midway between such lugs or projections 14, 14, the ring bears against the inner surface of the surrounding companion ring 11.

The outwardly deflected ends 15, 15 of the ring 13 are held together and prevented from further spreading by an adjustable screw 16 threaded into a hole in one end of the ring and extending loosely through an aligned hole in the complementary end.

The associated top piston-ring 11 is fitted to the cylinder bore in the usual manner, its ends having a few thousandths of an inch clearance.

The thermostatic ring 13 having been placed in the piston-ring groove, the adjustment-screw 16 is manipulated or turned so that the ends of the piston-ring 11 will just touch when forced together, under which circumstances, the thermostatic material of the inner ring is holding the piston and the piston-ring 11 concentric to each other, the thermostatic ring being stiff or strong enough to overcome the torque of the connecting-rod on the wrist-pin.

From the foregoing, it will be understood that any expansion of the piston-head will be exactly compensated for by the expansion of the inner thermostatic ring and its lessened outward spring pressure.

The steel piston does not come into contact with the cylinder-wall, being held properly spaced therefrom by the interposed piston-rings, which, in this instance, function somewhat differently than do the usual piston-rings, the latter really acting as hardly more than mere spacers or fillers between the piston and the cylinder-wall without lending substantial support to the former.

The upper portion of the piston has a depending, rectangular, hollow section or skirt 17 disposed inwardly some little distance from the cylinder-wall, two, opposite walls of such piston portion having half bearings 18, 18 for the accommodation of the hollow piston-pin 19 by means of which the connecting-rod (not shown) is operatively joined thereto, such pin being held in such semi-cylindrical sockets by screws 20, 20 or by stud-bolts and associated nuts.

The other two walls of the piston section 17 have outstanding, rounded, bearing members 21, 21 parallel to the piston-head and to the axis of the bearings 18, 18, and on these, floating, transversely-curved, bearing shoes or blocks 22, 22 are rockingly mounted, each such member having a bearing 23 for the reception of the corresponding companion supporting element 21.

The outer faces of such blocks are laterally rounded or curved to conform to the surface of the cylinder-wall on which they are adapted to slide and they are also desirably so shaped as to overlap the ends of the bearings 21.

These floating blocks are, of course, provided to take the side thrusts caused by the angularity of the connecting-rod and they may be made of cast-iron, or any other metal or alloy that will wear well in sliding contact with the inner surface of the cylinder wall.

From the above, it will be clear, that the head portion of the piston is supported and guided by the piston-rings in such a way that neither it nor they can tilt or tip and thereby cause the rings to scrape on the cylinder-wall on one side and ride over the oil film on the other side which, as has been indicated, is one of the causes of objectionable oil-pumping.

The piston and rings are compelled to maintain a true and untilted relation to the cylinder in which they travel, and hence they do not remove an undue quantity of lubricating oil from the cylinder surface, nor do they tend to cause excessive wear on the cylinder.

On the contrary, the floating-blocks or guide-shoes are rockingly mounted as specified, so that they may oscillate slightly on their bearings and in large measure ride over the film of oil on the cylinder's surface, thus considerably reducing friction and lessening wear on the parts involved.

Because of this advantageous lubricating action, it is possible to use light-weight blocks with comparatively-small, bearing surfaces to carry the load.

The bearing-blocks may be made adjustable so that when the cylinder is reground, it is not necessary to use an entirely new piston, because the shoes or blocks cover a small arc only on the cylinder-wall.

The adjustment feature also makes it possible to use the same size piston with slightly different-diameter cylinders.

Such a modification is shown in Figure 5, wherein each block or shoe 31 has a universal-joint or ball-and-socket connection 32 with a rod 33 threaded in the piston-wall at 34 and fitted with a suitable lock-nut 35.

This style of device is presented merely as an example of many ways in which such adjustment can be secured and which will be quite apparent to those skilled in this art.

A modified form of thermostatic ring is presented in Figures 6 and 7 and is adapted to be used in the present type of piston both for new work, as well as for eliminating the noise and centering the piston in cars that have worn considerably.

In this style, the thermostatic ring 41 is made from a rolled strip of thermostatic bi-metal which is cut into lengths and formed into rings to fit a given diameter piston.

The outer metal strip of the ring has spaced outwardly-projecting lugs 42, 42 pressing against the inner surface of the associated piston-ring 43, and such outer strip also has separated lugs 44, 44 extended inwardly through holes in the inner strip and bearing on the back wall of the piston groove.

Owing to the weakening of the inner strip by forming such holes therein, under the action of heat, the several sections of the ring tend to straighten out and reduce their outward pressure on the piston-ring.

Such lugs also provide spaces so that formation of carbon on either side of the thermostatic ring will not interfere with its proper working.

These lugs or projections, in addition, supply means for adjustment of the rings, as a few strokes of the file on them will reduce the diameter to give the proper initial clearance.

As will be readily understood, this invention is susceptible of a variety of other desirable and valuable embodiments, those presented in detail herein being by way of example only.

I claim:

1. The combination of a piston having a piston-ring groove, a piston-ring in said groove of an external diameter to snugly fit the cylinder in which the piston is to be used, and a thermostatic ring in said groove behind the piston-ring and pressing outwardly on the latter.

2. The combination of an internal-combustion engine piston having a piston-ring groove, an elastic piston-ring in said groove, and thermostatic means between the piston-ring and piston and forcing the former outwardly and compensating for the expansion and contraction of the piston due to changes in temperature to which it is subjected.

3. The combination of an internal-combustion engine piston having a piston-ring groove, an elastic piston-ring in said groove, and a bi-metal thermostatic ring between said piston-ring and the inner wall of said groove and bearing at intervals on such wall.

4. The combination of an internal-combustion engine piston having a piston-ring groove, an elastic piston-ring in said groove, a multiple-metal thermostatic ring between the inner surface of said piston-ring and the opposing wall of said groove and bearing at intervals on such wall, and means to adjust the circumference of said thermostatic ring.

5. The combination of an internal-combustion engine piston having a piston-ring groove, an elastic piston ring in said groove, and a thermostatic bi-metal ring in said groove back of said piston-ring and bearing at alternate points on the inner surface of said piston-ring and the opposed inner wall of said groove.

6. A thermostatic bi-metal ring having alternate inner and outer projections adapted to bear on the inner wall of a piston-ring groove of a piston and on the inner face of an elastic piston-ring in such groove.

7. A piston ring having associated therewith means for expanding the same, comprising, two strips of different materials having different rates of thermal expansion, said strips being locked together against relative longitudinal movement.

8. A piston ring having associated therewith by positioning thereunder in the piston ring groove, two strips of different materials having different rates of thermal expansion, said strips being locked together against relative longitudinal movement.

9. A piston ring expander, comprising, a ring constructed of two strips of different materials having different rates of thermal expansion, said strips being locked together against relative longitudinal movement.

10. As an article of manufacture, a piston formed of light-weight material and having a circumferential groove formed therein, a split ring in the groove, and a thermostatic spring member lying under the split ring, the thermostatic member being so arranged that when cold it presses the part of the ring outwardly away from the piston, the pressure being relaxed as the parts become heated.

In witness whereof I have hereunto set my hand.

IRA A. WEAVER.